US012623321B2

(12) United States Patent
Shaw et al.

(10) Patent No.: US 12,623,321 B2
(45) Date of Patent: May 12, 2026

(54) HAZARD DETECTION FOR TORQUE WRENCH

(71) Applicant: ENERPAC TOOL GROUP CORP., Milwaukee, WI (US)

(72) Inventors: Robin Shaw, Whitley Bay (GB); Andrew Dumelow, North Shields (GB)

(73) Assignee: ENERPAC TOOL GROUP CORP., Milwaukee, WI (US)

( * ) Notice: Subject to any disclaimer, the term of this patent is extended or adjusted under 35 U.S.C. 154(b) by 326 days.

(21) Appl. No.: 18/026,764

(22) PCT Filed: Oct. 15, 2021

(86) PCT No.: PCT/US2021/055268
§ 371 (c)(1),
(2) Date: Mar. 16, 2023

(87) PCT Pub. No.: WO2022/082037
PCT Pub. Date: Apr. 21, 2022

(65) Prior Publication Data
US 2023/0339082 A1 Oct. 26, 2023

Related U.S. Application Data

(60) Provisional application No. 63/092,131, filed on Oct. 15, 2020, provisional application No. 63/092,188, filed on Oct. 15, 2020.

(51) Int. Cl.
*B25B 23/145* (2006.01)
*B25B 21/00* (2006.01)
(Continued)

(52) U.S. Cl.
CPC ...... *B25B 23/1456* (2013.01); *B25B 23/0078* (2013.01); *B25F 5/00* (2013.01);
(Continued)

(58) Field of Classification Search
CPC ....... B25B 23/00; B25B 23/14; B25B 23/145; B25B 23/1456; B25B 23/0078;
(Continued)

(56) References Cited

U.S. PATENT DOCUMENTS

2011/0203821 A1* 8/2011 Puzio ........................ B25F 5/00
173/176
2012/0090864 A1 4/2012 Junkers
(Continued)

FOREIGN PATENT DOCUMENTS

CN 108466217 8/2018
CN 208034590 U 11/2018
(Continued)

OTHER PUBLICATIONS

Extended European Search Report issued in Corresponding EP Application No. 21881215.4, dated Aug. 27, 2024.
(Continued)

*Primary Examiner* — C. A. Rivera
(74) *Attorney, Agent, or Firm* — ANDRUS INTELLECTUAL PROPERTY LAW, LLP

(57) ABSTRACT

A hydraulic torque wrench and method of operation. The wrench may include a housing supporting a drive element for engaging a fastener; a drive actuator for exerting a torque on the drive element; a sensor configured to sense movement of the housing; and a controller having an electronic processor, the controller being configured to receive a first signal from the sensor, determine, based on the signal, whether the housing is moving, and inhibit operation of the drive actuator in response to the housing of the hydraulic torque wrench moving.

26 Claims, 6 Drawing Sheets

(51) Int. Cl.

| | | |
|---|---|---|
| *B25B 23/00* | (2006.01) | |
| *B25F 5/00* | (2006.01) | |
| *G05B 19/042* | (2006.01) | |

(52) U.S. Cl.
CPC ............ *B25F 5/005* (2013.01); *G05B 19/042* (2013.01); *B25B 21/005* (2013.01); *G05B 19/0426* (2013.01)

(58) Field of Classification Search
CPC .......... B25B 21/005; B25F 5/00; B25F 5/005; G05B 19/042; G05B 19/0426
See application file for complete search history.

(56) References Cited

U.S. PATENT DOCUMENTS

| | | | |
|---|---|---|---|
| 2014/0165790 A1 | 6/2014 | Neiß et al. | |
| 2016/0297056 A1* | 10/2016 | Colletti | ................ B25B 21/005 |
| 2017/0082510 A1 | 3/2017 | Futai | |
| 2019/0126456 A1 | 5/2019 | Abbott | |
| 2019/0344421 A1 | 11/2019 | Lu | |
| 2020/0114496 A1 | 4/2020 | Tang | |
| 2020/0139520 A1 | 5/2020 | Fallon et al. | |

FOREIGN PATENT DOCUMENTS

| | | | | |
|---|---|---|---|---|
| CN | 111136606 | A | 5/2020 | |
| EP | 2722132 | A2 | 4/2014 | |
| JP | 2015208822 | A | 11/2015 | |
| JP | 2021079509 | A * | 5/2021 | |
| KR | 10-2006-0123769 | | 12/2006 | |
| WO | 2018003571 | A1 | 1/2018 | |
| WO | WO-2021095533 | A1 * | 5/2021 | ............. B25B 21/00 |

OTHER PUBLICATIONS

International Search Report and the Written Opinion for PCT/US2021/055266 dated Feb. 4, 2022.

International Preliminary Report on Patentability for PCT/US2021/055266 dated Apr. 27, 2023.

Extended European Search Report issued in EP Application No. 21881213.9, dated Oct. 1, 2024.

International Search Report and the Written Opinion for PCT/US2021/055268, dated Jan. 28, 2022.

International Preliminary Report on Patentability for PCT/US2021/055268, dated Apr. 27, 2023.

* cited by examiner

600

605

CONTROLLER RECEIVES SIGNAL
FROM ORIENTATION SENSOR

610

CONTROLLER
DETERMINES IF
IMPROPER MOVEMENT OF
TORQUE WRENCH HOUSING
OCCURS

NO

YES

620

ENABLE OPERATION OF
DRIVE ACTUATOR IF IMPROPER
MOVEMENT OF HOUSING
DOES NOT OCCUR

615

INHIBIT OPERATION OF
DRIVE ACTUATOR IF
IMPROPER MOVEMENT
OF HOUSING OCCURS

HAZARD DETECTION FOR TORQUE WRENCH

CROSS-REFERENCE TO RELATED APPLICATIONS

This application is the U.S. national stage application of International Application PCT/US2021/055268, filed Oct. 15, 2021, which international application was published on Apr. 21, 2022, as International Publication WO 2022/082037. The International Application claims the benefit of U.S. Patent Application No. 63/092,131, filed Oct. 15, 2020, and of U.S. Patent Application No. 63/092,188, filed Oct. 15, 2020. All of which applications are hereby incorporated by reference in entirety.

FIELD

The present disclosure relates to industrial tools and, particularly, to hydraulic torque wrenches.

SUMMARY

Industrial tools, such as hydraulic torque wrenches, use pressurized fluid to apply large torques to a workpiece (e.g., fastener, nut, etc.). In particular, application of pressurized fluid to a piston drives a socket to rotate in a first direction. In order to ensure that the torque is properly transmitted to the socket, a portion of the wrench body is positioned against a reaction surface to resist a reactionary force exerted against the wrench in a second direction opposite to the first direction. If the wrench is not properly positioned against a reaction surface prior to application of the pressurized fluid, the reaction force may cause the wrench body to rotate in the second direction upon application of the pressurized fluid. Rotation of the torque wrench body may result in damage to the operator, such as pinched fingers or broken hands, and/or to the wrench.

In one independent aspect, a hydraulic torque wrench may generally include a housing supporting a drive element for engaging a fastener; a drive actuator for exerting a torque on the drive element; a sensor configured to sense movement of the housing; and a controller having an electronic processor, the controller being configured to receive a signal from the sensor, determine, based on the signal, whether the housing is moving, and inhibit operation of the drive actuator in response to the housing moving.

In some aspects, the sensor may be an orientation sensor. In some aspects, the drive actuator may be configured to receive pressurized fluid from a hydraulic pump for exerting a torque on the drive element. In some aspects, the wrench may further include a rotation sensor configured to sense rotation of the drive element.

In some aspects, the controller may further be configured to inhibit operation the hydraulic pump in response to the housing moving while the drive element is rotating. In some aspects, the controller may further be configured to inhibit operation the drive actuator in response the housing moving while the drive element is rotating.

In some aspects, the wrench may further include an indicator, and the controller may further be configured to activate the indicator in response the housing moving. In some aspects, the controller may further be configured to determine that the housing is moving in response to the signal indicating that acceleration of the housing exceeds a threshold.

In some aspects, the wrench may further include a torque sensor configured to sense an amount of torque applied by the drive element to the fastener. In some aspects, the controller may further be configured to inhibit operation of the drive actuator in response to the amount of torque exceeding a threshold.

In some aspects, the housing may further include a reaction portion. In some aspects, the reaction portion may engage a reaction surface to inhibit movement of the housing. In some aspects, the reaction portion may be removably attached to the housing.

In another independent aspect, a method may be provided for operating a hydraulic torque wrench. The wrench may include a housing that supports a drive element, a sensor, and a controller having an electronic processor. The method may generally include receiving, by the controller, a signal from the sensor indicative of movement of the housing; determining, by the controller, whether the housing is moving based on the signal; and inhibiting, by the controller, operation of the drive actuator in response the housing moving.

In some aspects, receiving, by the controller, a signal from the sensor may include receiving, by the controller, a signal from an orientation sensor. In some aspects, the method may further include receiving, by the drive actuator, pressurized fluid from a hydraulic pump for exerting a torque on the drive element. In some aspects, the method may further include inhibiting, by the controller, operation of the hydraulic pump in response to the housing moving.

In some aspects, the method further includes sensing, by a rotation sensor of the wrench, rotation of the drive element; and inhibiting, by the controller, operation of the hydraulic pump in response to the housing moving while the drive element is rotating. In some aspects, the method further includes activating, by the controller, an indicator of the wrench in response to the housing moving while the drive element is rotating.

In some aspects, the method may further include sensing, by a rotation sensor of the wrench, rotation of the drive element; and inhibiting, by the controller, operation of the drive actuator in response to the housing moving while the drive element is rotating. In some aspects, the method may further include activating, by the controller, an indicator of the wrench in response to the housing moving.

In some aspects, the method may further include determining, by the controller, that the housing is moving in response to the signal indicating that acceleration of the housing exceeds a threshold. In some aspects, the method may further include sensing, by a torque sensor of the wrench, an amount of torque applied by the drive element to a fastener; and inhibiting, by the controller, operation of the drive actuator in response to the amount of torque exceeding a threshold.

In some aspects, the housing may further include a reaction portion, and the method may further include engaging a reaction surface with the reaction portion to inhibit movement of the housing. In some aspects, the reaction portion may be removably attached to the housing, and the method may further include attaching the reaction portion to the housing.

Other independent aspects may become apparent by consideration of the detailed description, claims and accompanying drawings.

DETAILED DESCRIPTION

Figure 1:
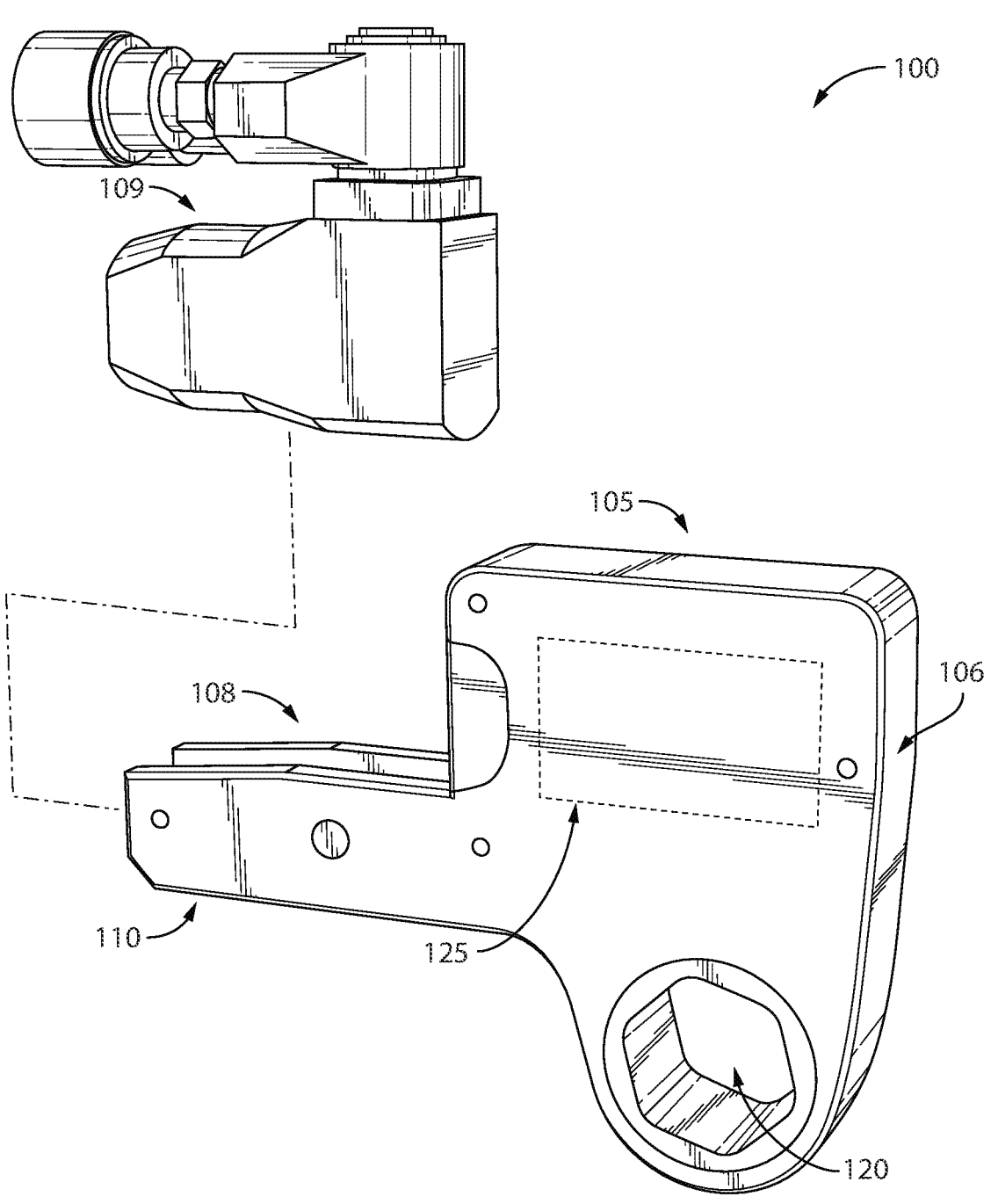
FIG. 1 is a perspective view of a hydraulic torque wrench.

Before any independent embodiments are explained in detail, it is to be understood that the disclosure is not limited in its application to the details of construction and the arrangement of components set forth in the following description or illustrated in the following drawings. The disclosure is capable of other independent embodiments and of being practiced or of being carried out in various ways. Also, it is to be understood that the phraseology and terminology used herein is for the purpose of description and should not be regarded as limiting.

Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof. Unless specified or limited otherwise, the terms "mounted," "connected," "supported," and "coupled" and variations thereof are used broadly and encompass both direct and indirect mountings, connections, supports, and couplings.

Relative terminology, such as, for example, "about", "approximately", "substantially", etc., used in connection with a quantity or condition would be understood by those of ordinary skill to be inclusive of the stated value and has the meaning dictated by the context (for example, the term includes at least the degree of error associated with the measurement of, tolerances (e.g., manufacturing, assembly, use, etc.) associated with the particular value, etc.). Such terminology should also be considered as disclosing the range defined by the absolute values of the two endpoints. For example, the expression "from about 2 to about 4" also discloses the range "from 2 to 4". The relative terminology may refer to plus or minus a percentage (e.g., 1%, 5%, 10% or more) of an indicated value.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more processing units, such as a microprocessor and/or application specific integrated circuits ("ASICs"). As such, it should be noted that a plurality of hardware and software based devices, as well as a plurality of different structural components, may be utilized to implement the embodiments. For example, "servers" and "computing devices" described in the specification can include one or more processing units, one or more computer-readable medium modules, one or more input/output interfaces, and various connections (e.g., a system bus) connecting the components.

Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way but may also be configured in ways that are not listed.

Figure 2:
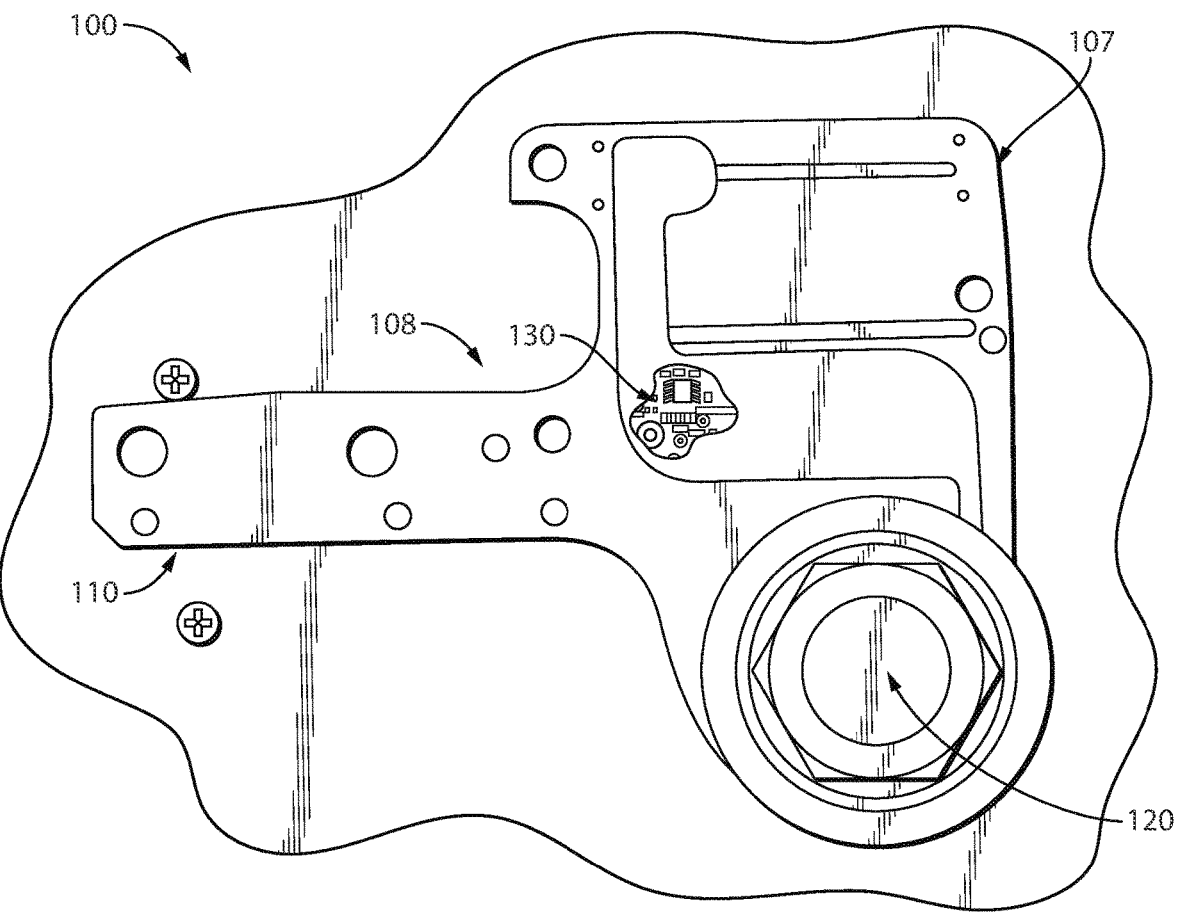
FIG. 2 is a perspective view of the wrench of FIG. 1, illustrated with an outer portion of the wrench housing removed.

FIG. 1 illustrates an industrial tool, such as a hydraulic torque wrench 100 for applying torque to a fastener. The wrench 100 includes a cassette or housing 105 having an outer portion 106 and an inner portion 107 (FIG. 2). In some constructions, the portions 106, 107 are separate structures, fastened or otherwise coupled together. In other constructions, the portions 106, 107 are integrally formed as one piece.

The housing 105 further includes a coupling interface 108 configured to engage a drive unit 109 for actuating a drive element (e.g., a socket 120). In addition, the wrench 100 includes a reaction portion 110. In some constructions, the reaction portion 110 is integrally formed with housing 105. In some constructions, the reaction portion 110 is removably attached to the housing 105. The housing 105 may be constructed of metal (e.g., steel), a durable and light-weight plastic material, or a combination thereof.

The drive element (e.g., a socket 120) is supported by the housing 105 and is driven by a drive system 125 disposed within housing 105. In the illustrated construction, the drive element is a socket 120 operable to receive a workpiece (e.g., a fastener) to apply torque to the workpiece; in other constructions, the drive element may include a drive shaft (not shown) operable to be positioned within an opening of a workpiece to apply torque to the workpiece.

In some constructions, the drive system 125 includes a ratcheting lever arm (not shown) for engaging and rotating the socket 120. The lever arm is driven by a working end of a fluid actuator (not shown) on the drive unit 109. The fluid actuator is in fluid communication (e.g., by one or more hoses) with an external source of pressurized fluid (e.g., a hydraulic pump (not shown)) and may include a piston.

For illustrative purposes, operation of the wrench 100 will be described with respect to a drive unit 109 that includes one fluid actuator; however, it should be understood that the drive unit 109 may include more pistons, additional fluid actuators, and/or additional lever arms. The piston is movable between an extended position and a retracted position due to the pressurized fluid, and movement of the piston drives the working end.

While the drive unit 109 is coupled to the wrench 100, the working end of the fluid actuator is operatively coupled to the lever arm. In some constructions, the lever arm includes a ratcheting pawl that engages a sprocket coupled to the socket 120. When hydraulic pressure is applied to extend the working end, the lever arm is operable to rotate the socket 120 and drive element in the first direction. When the working end is retracted, the lever arm rotates in a second, opposite direction and ratchets relative to the sprocket and the socket 120.

FIG. 2 illustrates the wrench 100 with the outer portion 106 of the housing 105 removed. As shown in FIG. 2, the wrench 100 includes a printed circuit board (PCB) 130 supported by inner portion 107 of the housing 105. The PCB 130 supports one or more electronic elements of a control system of the wrench 100.

Figure 3:
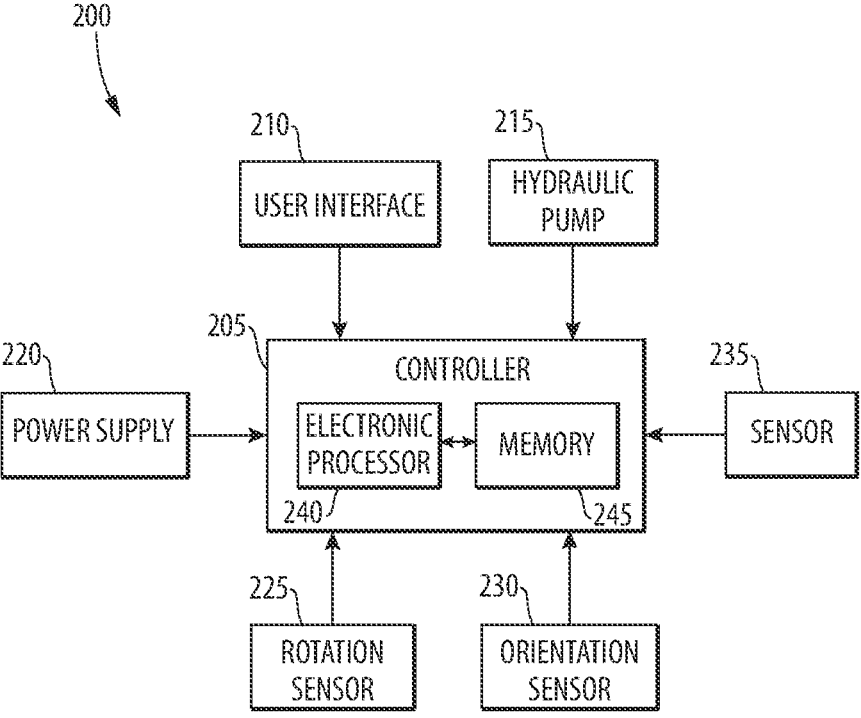
FIG. 3 is a block diagram of the wrench of FIG. 1.

FIG. 3 is a block diagram of a control system 200 of the wrench 100. The illustrated control system 200 includes a controller 205, which may be mounted on a surface the PCB 130. The controller 205 is electrically and/or communicatively connected to a variety of modules or components of the wrench 100. For example, the controller 205 is connected to a user-interface 210, a hydraulic pressure source or pump 215, a power supply 220, a rotation sensor 225, an orientation sensor 230, and one or more additional sensors 235.

In some constructions, the controller 205 includes a plurality of electrical and electronic components that provide power, operational control, and protection to the components and modules within the controller 205 and/or the wrench 100. For example, the controller includes, among other things, an electronic processor 240 and a memory 245.

The memory 245 includes, for example, a program storage area and a data storage area. The program storage area and the data storage area can include combinations of different types of memory, such as read-only memory (ROM) and random access memory (RAM). Various non-transitory computer readable media, for example, magnetic, optical, physical, or electronic memory may be used. The electronic processor 240 is communicatively coupled to the memory 245 and executes software instructions that are stored in the memory 245, or stored in another non-transitory computer readable medium such as another memory or a disc. The software may include one or more applications, program data, filters, rules, one or more program modules, and other executable instructions.

The user-interface 210 is configured to receive input from a user and/or output information to the user concerning the hydraulic wrench 100. The user-interface 210 may include a power switch for controlling flow of pressurized fluid from the hydraulic pump 215 to the wrench 100. In other constructions, the user-interface 210 includes, in addition to or in lieu of a power switch, a display (for example, a primary display, a secondary display, etc.) and/or input devices (for example, touch-screen displays, a plurality of knobs, dials, switches, buttons, etc.). The display may be, for example, a liquid crystal display ("LCD"), a light-emitting diode ("LED") display, an organic LED ("OLED") display, an electroluminescent display ("ELD"), a surface-conduction electron-emitter display ("SED"), a field emission display ("FED"), a thin-film transistor ("TFT") LCD, etc. In some constructions, the user-interface 210 is a pendant. In other constructions, the user-interface 210 is a remote device such as a smartphone, a tablet, etc.

The user-interface 210 may further include an indicator (not shown) configured to display conditions of, or information associated with, the wrench 100. The indicator may be further configured to alert a user to a change in the condition of the wrench 100 (e.g., when the wrench 100 is improperly oriented). In some constructions, the indicator may include one or more lights (for example, light emitting diodes), varying in color and orientation. In some constructions, the indicator may include elements to convey information to a user through audible or tactile outputs (for example, a speaker and/or vibration motor).

The power supply 220 is configured to supply power to the controller 205 and/or other components of the control system 200. In some constructions, the power supply 220 receives power from an internal power source (e.g., a coin cell battery, battery cell, or battery pack) and provides regulated power to the controller 205 and/or other components of the control system 200. In some constructions, the power supply 220 may include DC-DC converters, AC-DC converters, DC-AC converters, and/or AC-AC converters. In other constructions, the power supply 220 may receive power from an AC power source (for example, an AC power outlet).

The rotation sensor 225 senses rotation of the drive element 120 (FIG. 1) during operation of the wrench 100. In some constructions, in response to the controller 205 receiving a signal from the rotation sensor 225 indicating that the socket 120 is rotating, the controller 205 determines that the hydraulic pump 215 is supplying pressurized fluid to the wrench 100. The controller 205 may be configured to deactivate the wrench 100 and/or the hydraulic pump 215 in response to the rotation sensor 225 sensing that the socket 120 has rotated by a predetermined amount. As described in more detail below, the controller 205 is further configured to deactivate the wrench 100 and/or hydraulic pump 215 in response to rotation of the socket 120 being sensed during a condition in which damage could result.

The orientation sensor 230 is configured to sense acceleration of the wrench housing 105. The orientation sensor 230 may be mounted on a surface of PCB 130 or some other surface of the housing 105. For example, the orientation sensor 230 may be a 6-axis accelerometer or a 9 Degrees of Freedom (9-DOF) sensor. The orientation sensor 230 is configured to measure acceleration in 3 axes and transmit the acceleration measurements to the controller 205.

The controller 205 is configured to determine motion of the wrench housing 105 based on the measurement signals received from the orientation sensor 230. In some constructions, the controller 205 is configured to determine the orientation of the wrench 100 with respect to gravity based on the measurement signal received from the orientation sensor 230. As described in more detail below, the controller 205 is configured to deactivate the wrench 100 and/or the hydraulic pump 215 in response to acceleration of the wrench 100 being sensed while the socket 120 is rotating.

As described above, the control system 200 further includes one or more additional sensors 235, for example, for sensing the amount of torque applied by the wrench 100 to the workpiece. The sensors 235 can generate signals corresponding to the magnitude of torque which are subsequently sent to and interpreted by the controller 205. The controller 205 may be configured to indicate to a user, using the indicator included in user-interface 210, when a predetermined torque has been reached. In some constructions, the controller 205 is configured to deactivate the wrench 100 when the predetermined torque has been reached. The sensors 235 may be pressure sensors, strain gauges, position sensors, other suitable sensors, combinations thereof, etc.

Figure 4:
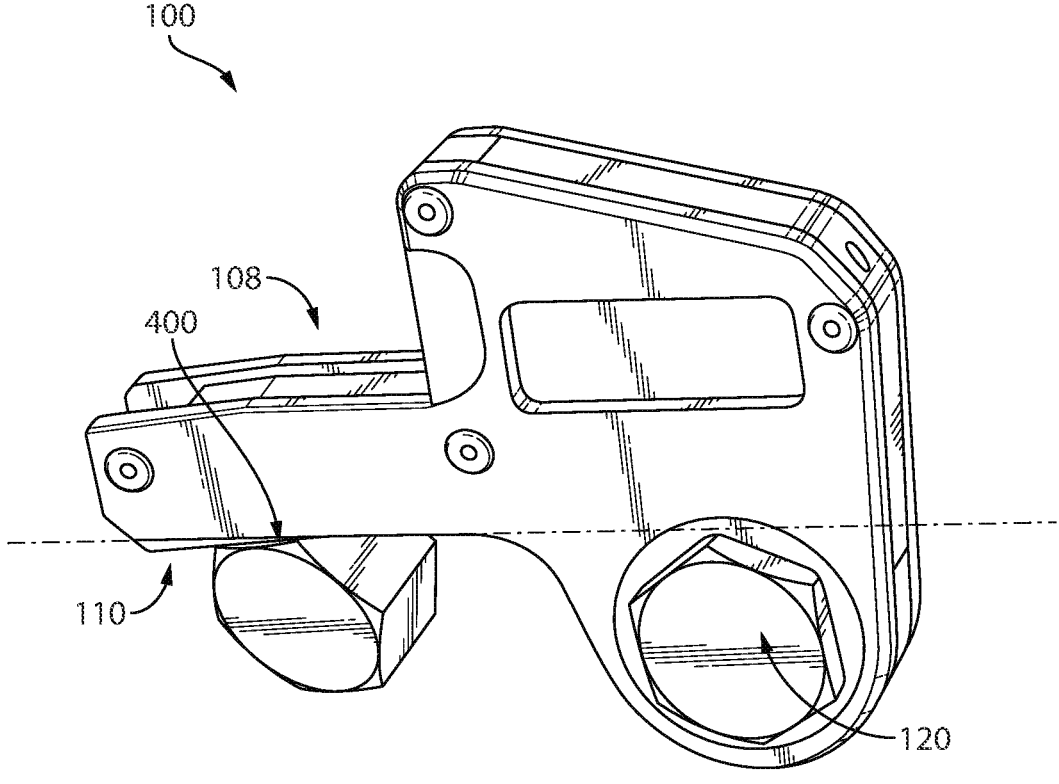
FIG. 4 is a perspective view of the wrench of FIG. 1, illustrated oriented in a first position.

Prior to operation of the torque wrench 100, a workpiece (e.g., a fastener, a nut) is positioned in engagement with the drive element 120. In addition, an operator of the wrench 100 is recommended to seat or press the reaction portion 110 of the wrench 100 against a reaction surface before actuating the fluid actuator in the wrench 100. When the operator enables pressurized fluid to actuate the fluid actuator of the drive system 125, the socket 120 is driven to rotate in a first direction (e.g., clockwise as shown in FIG. 4), thus tightening the fastener positioned within socket 120. For example, pressurized fluid may be provided to the fluid actuator in response to a user pressing the power switch of user-interface 210.

The application of torque to the socket 120 results in a reactionary force applied on the wrench 100 in a second direction (e.g., counterclockwise) opposite to the first direction of rotation of the socket 120. If the reaction portion 110 of the wrench 100 is not properly seated against a reaction surface (for example, illustrated in FIG. 4 as a surface of an adjacent nut) prior to activation of the hydraulic pump 215, the housing 105 of the wrench 100 will rotate in the second direction (e.g., counterclockwise). This undesired rotation of the wrench 100 may result in damage to the operator (e.g., pinched fingers, broken hand, etc.) and/or the wrench 100.

FIG. 4 illustrates the reaction portion 110 properly seated against a reaction surface 400. In some constructions, the reaction surface 400 is a surface (e.g., another bolt and/or nut) adjacent to the fastener being tightened by the socket 120. In other constructions, the reaction surface 400 is any stationary surface adjacent the wrench 100 that inhibits rotation of the wrench 100 in a direction opposite to the rotation direction of the socket 120.

The reaction surface 400 is intended to inhibit rotation or movement of housing 105 of the wrench 100 in the second direction (e.g., counterclockwise). As shown, the reaction portion 110 is pressed against the reaction surface 400 such that the wrench 100 is blocked from rotating in the second direction when the hydraulic pump 215 applies pressure to the drive system 125. In other words, when properly seated, there is no open space or material (e.g., a portion of the operator's hand) positioned between the reaction portion 110 and the reaction surface 400.

Figure 5A:
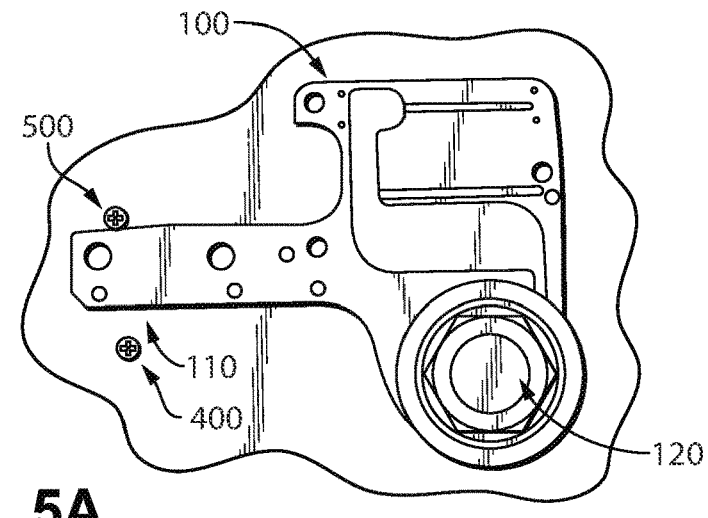
FIGS. 5A-5C are perspective views of the wrench of FIG. 1, illustrated oriented in various positions.
Figure 5B:
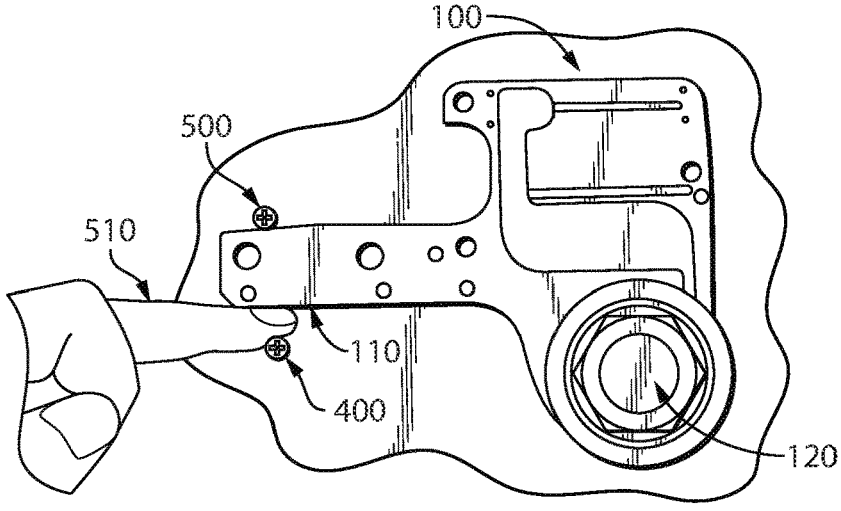
Figure 5C:
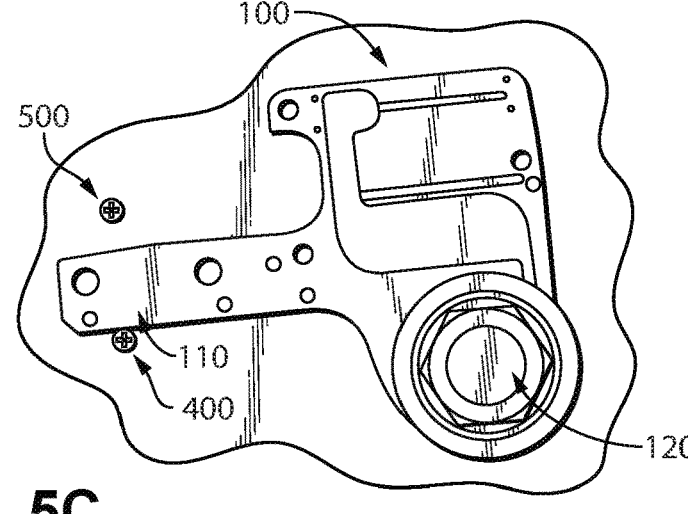

FIGS. 5A-5C illustrate conditions in which the reaction portion 110 is not properly seated against a reaction surface 400. As shown in FIG. 5A, the reaction portion 110 is spaced from reaction surface 400 (although an additional surface 500 is illustrated for reference, it is understood that the surface 500 may not be present). When pressure is applied to the drive system 125 to rotate the socket 120, the wrench 100 is free to rotate in the counterclockwise direction towards reaction surface 4000. Consequently, if something (e.g., a portion of the operator's hand 510 (FIG. 5C)) is positioned between the reaction portion 110 and reaction surface 400 (FIG. 5B), it may be pinched or by the rotating reaction portion 110. FIG. 5C illustrates the reaction portion 110 driven by the reaction force to press against the reaction surface 400.

The controller 205 detects the presence of such a condition and prevents operation of the wrench 100 and/or the hydraulic pump 215 in response to undesired motion of the wrench 100 occurring while the socket 120 is tightening a fastener. During operation of the wrench 100, the controller 205 is configured to monitor signals received from the rotation sensor 225 and the orientation sensor 230.

In particular, the controller 205 is configured to determine whether the socket 120 is rotating, and thus, whether the hydraulic pump 215 is applying pressure to the drive system 125 based on signals received from the rotation sensor 225. In some constructions, the controller 205 determines that the socket 120 is rotating if the rotation angle of socket 120 exceeds a predetermined rotation threshold (e.g., 1 or 2 degrees).

Furthermore, the controller 205 is configured to determine whether the housing 105 of the wrench 100 is moving or rotating based on signals received from the orientation sensor 230. In some constructions, the controller 205 determines that the wrench housing 105 is rotating or moving in response to the acceleration of torque wrench 100 exceeding a minimum acceleration threshold. If the controller 205 determines that the wrench housing 105 is moving while socket 120 is rotating, the controller 205 deactivates the wrench 100 and/or the hydraulic pump 215 to stop the rotation of the wrench 100 and inhibit damage.

Moreover, the controller 205 is configured to determine that undesired motion of the wrench 100 while the socket 120 rotates is a result of a failure to properly engage the reaction portion 110 against a reaction surface 400. In some constructions, the controller 205 may be configured to alert the operator to the occurrence of the unwanted rotation condition by activating the indicator of the user-interface 210. In some constructions, the controller 205 may be configured to rotate the socket 120 in a reverse, or counterclockwise, direction upon detecting the occurrence of the unwanted rotation condition.

As described above, the controller 205 determines that an unwanted rotation condition occurs in response to the wrench housing 105 accelerating while the socket 120 is rotating. To avoid having the controller 205 prevent operation of the wrench 100 and/or the hydraulic pump 215 while the wrench 100 is properly positioned, in some constructions, the controller 205 is configured to prevent operation of the torque wrench 100 and/or the hydraulic pump 215 only if acceleration of the wrench 100 occurs within a time threshold of rotation of the socket 120 (e.g., 1 millisecond). The time threshold may be set at manufacture or may be configured by the operator.

The controller 205 would not disable the wrench 100 and/or the hydraulic pump 215 in response to the operator setting the wrench 100 prior to rotation of the socket 120. For example, if the operator positions the reaction portion 110 against a reaction surface 400 one second before activating the hydraulic pump 215, the controller 205 will not deactivate the wrench 100. However, if the reaction portion 110 is not properly seated against a reaction surface 400 prior to operation, the controller 205 will detect motion of the wrench 100 that occurs within the time threshold of rotation of the socket 120, and, in response, the controller 205 would deactivate the wrench 100 and/or the hydraulic pump 215.

Figure 6:
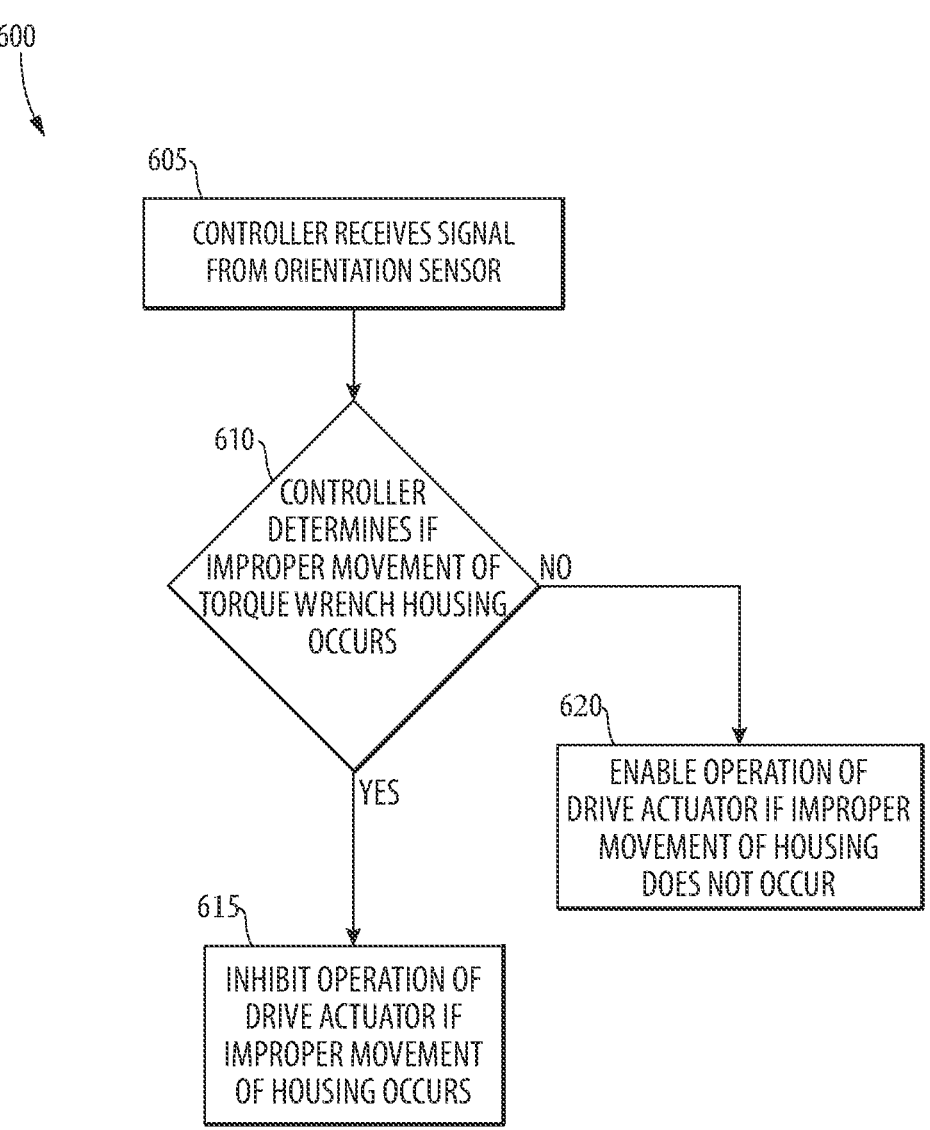
FIG. 6 is a flowchart illustrating a process or operation of the wrench of FIG. 1.

FIG. 6 is a flowchart illustrating a process, or operation, 600 for operating the wrench 100. It should be understood that additional steps may be added and not all of the steps may be required.

The controller 205 of the wrench 100 receives a signal from orientation sensor 230 (block 605). Based on the signal received from orientation sensor 230, the controller 205 determines whether improper movement of the wrench housing 105 occurs (block 610). In response to the controller 205 determining that the housing 105 is moving, the controller 205 inhibits operation of the drive actuator (block 615). Otherwise, the controller 205 enables operation of the drive actuator (block 620). In some constructions, the controller 205 may determine whether movement of the wrench housing 105 occurs while the socket 120 is rotating.

As described in U.S. Patent Application No. 63/092,131 and in PCT patent application Ser. No. PCT/US2021/055266, filed Oct. 15, 2021, entitled "Orientation Sensor for Guided Operation of Hydraulic Torque Wrench", which is hereby incorporated by reference, the control system 200 (e.g., including the controller 205, the sensors 225, 230, 235) may be employed to control other operations or functions of the wrench 100, such as, for example, sensor guided operation of the wrench 100.

Thus, the application may provide, among other things, pinch hazard detection for a hydraulic torque wrench.

The embodiment(s) described above and illustrated in the figures are presented by way of example only and are not intended as a limitation upon the concepts and principles of the present disclosure. As such, it will be appreciated that variations and modifications to the elements and their configuration and/or arrangement exist within the spirit and scope of one or more independent aspects as described.

One or more independent features and/or advantages of the application may be set forth in the following claims:

What is claimed is:

1. A hydraulic torque wrench comprising:
a housing supporting a drive element configured to engage a fastener;
a drive actuator configured to rotate the drive element in a first direction;
wherein the hydraulic torque wrench is configured to engage a reaction surface to prevent rotation of the hydraulic torque wrench in a second direction opposite the first direction when the drive element is engaged with the fastener and the drive element is operated;
a sensor configured to sense said rotation of the housing in the second direction; and
a controller having an electronic processor, the controller being configured to determine that the housing is disengaged from the reaction surface and inhibit operation of the drive actuator upon receipt of a signal from the sensor indicating said rotation in the second direction.

2. The wrench of claim 1, wherein the sensor is-includes an orientation sensor.

3. The wrench of claim 1, wherein the drive actuator is configured to receive pressurized fluid from a hydraulic pump for exerting a torque on the drive element, and wherein the controller is configured to control operation of the hydraulic pump to in turn control said operation of the drive actuator.

4. The wrench of claim 3, wherein the controller is further configured to inhibit said operation of the hydraulic pump in response to receipt of the signal.

5. The wrench of claim 3, further comprising a rotation sensor configured to sense rotation of the drive element.

6. The wrench of claim 5, wherein the controller is configured to inhibit said operation of the hydraulic pump in response to receipt of the signal only when the rotation sensor senses rotation of the drive element.

7. The wrench of claim 1, wherein the controller is further configured to inhibit said operation of the drive actuator in response the signal only when the drive element is rotating.

8. The wrench of claim 1, further comprising an indicator, wherein the controller is configured to activate the indicator in response to receipt of the signal.

9. The wrench of claim 1, wherein the controller is configured to determine that the housing is moving only when the signal indicates that the housing is rotating in the second direction and that acceleration of the housing in the second direction exceeds a threshold.

10. The wrench of claim 1, further comprising a torque sensor configured to sense an amount of torque applied by the drive element to the fastener.

11. The wrench of claim 10, wherein the controller is further configured to inhibit operation of the drive actuator only when said amount of torque exceeds a threshold.

12. The wrench of claim 1, wherein the housing further includes a reaction portion.

13. The wrench of claim 12, wherein the reaction portion engages the reaction surface to prevent movement of the housing.

14. The wrench of claim 12, wherein the reaction portion is removably attached to the housing.

15. A method of operating the hydraulic torque wrench according to claim 12, the method comprising:
receiving, by the controller, the signal;
determining, by the controller, that the reaction portion is disengaged from the reaction surface based on the signal; and
inhibiting, by the controller, operation of the drive actuator.

16. The method of claim 15, wherein receiving, by the controller, the signal includes receiving, by the controller, the signal from an orientation sensor.

17. The method of claim 15, further comprising receiving, by the drive actuator, pressurized fluid from a hydraulic pump for exerting a torque on the drive element.

18. The method of claim 17, further comprising inhibiting, by the controller, operation of the hydraulic pump in response to the signal.

19. The method of claim 17, further comprising:
sensing, by a rotation sensor of the wrench, rotation of the drive element; and
inhibiting, by the controller, operation of the hydraulic pump in response to the signal only while the drive element is rotating.

20. The method of claim 19, further comprising activating, by the controller, an indicator of the wrench in response to the signal only when the drive element is rotating.

21. The method of claim 15, further comprising:
sensing, by a rotation sensor of the wrench, rotation of the drive element; and
inhibiting, by the controller, operation of the drive actuator in response to the signal only if the drive element is rotating.

22. The method of claim 15, further comprising activating, by the controller, an indicator of the wrench in response the signal.

23. The method of claim 15, further comprising determining, by the controller, the housing is moving in response to the signal, wherein the signal indicates that acceleration of the housing in the second direction exceeds a threshold.

24. The method of claim 15, wherein the method further comprises:
sensing, by a torque sensor of the wrench, an amount of torque applied by the drive element to a fastener; and
inhibiting, by the controller, operation of the drive actuator in response to the amount of torque exceeding a threshold.

25. The method of claim 15, further comprising engaging the reaction surface with the reaction portion to prevent movement of the housing.

26. The method of claim 25, wherein the reaction portion is removably attached to the housing, and wherein the method further comprises attaching the reaction portion to the housing.

* * * * *